(12) United States Patent
Shver et al.

(10) Patent No.: US 6,372,010 B1
(45) Date of Patent: Apr. 16, 2002

(54) METHOD FOR METAL MELTING, REFINING AND PROCESSING

(75) Inventors: Valery G. Shver, Alpharetta; Terry E. Pulliam, Oxford, both of GA (US)

(73) Assignee: Process Technology International, Inc., Tucker, GA (US)

( * ) Notice: Subject to any disclaimer, the term of this patent is extended or adjusted under 35 U.S.C. 154(b) by 0 days.

(21) Appl. No.: 09/459,303

(22) Filed: Dec. 10, 1999

(51) Int. Cl.[7] .................................................. C22B 4/08

(52) U.S. Cl. ........................................ 75/10.4; 75/10.46

(58) Field of Search ................................ 75/10.4, 10.46

(56) References Cited

U.S. PATENT DOCUMENTS 5,599,375 A * 2/1997 Gitman et al. ............. 75/10.42
6,176,894 B1 * 1/2001 Anderson et al. ............. 75/414

* cited by examiner

Primary Examiner—Roy King
Assistant Examiner—Tina McGuthry-Banks
(74) Attorney, Agent, or Firm—William A. Marvin (57) ABSTRACT

An improved method and apparatus for metal melting, refining and processing, particularly adapted to steel making in an electric arc furnace. The method provides auxiliary thermal energy to the steel making process, particulate injection for the formation of slag and foamy slag, and oxygen injection for the decarburization of the melt, for the formation of foamy slag and for post combustion burning of carbon monoxide. The burner includes two injection barrels for providing finely pulverized particles and for providing either a supersonic or a subsonic primary flow of an oxidizing gas. The barrels are positioned side by side in a nozzle at the entrance of a flame shaping chamber of a fluid cooled combustion chamber. The nozzle also contains a plurality of fuel orifices for the providing pressurized fuel to the combustion chamber and a plurality of oxidizing gas orifices for providing a secondary flow of an oxidizing gas around the periphery of the nozzle. Because all of the flows of fuel, oxidizing gas and particulates pass through the flame shaping chamber, they are all substantially directed to the same location in the electric arc furnace. The directionality of the flows allows the burner to heat a localized spot of the slag with thermal energy from the oxidation of the fuel, from the oxidation of oxidizable components in the slag or the melt by the lancing of supersonic oxidizing gas, or from any combination of these. Once a spot in the slag is sufficiently heated, a flow of carbon is directed to the localized hot spot in the slag to reduce the FeO, and other oxides, in the slag to carbon monoxide and produce foamy slag. The particulate carbon introduction can be accompanied by further oxidizing gas injection before, during or after the carbon injection.

6 Claims, 6 Drawing Sheets

METHOD FOR METAL MELTING, REFINING AND PROCESSING

BACKGROUND OF THE INVENTION

1. Field of the Invention

The present invention generally relates to an improved method and apparatus for metal melting, refining and processing, for example, steel making in an electric arc furnace (EAF), and more particularly, to an auxiliary burner or lance for the addition of thermal energy by the combustion of fuel, the injection of oxidizing gas for melt refining, foamy slag production or post combustion of carbon monoxide, and the injection of particulates for slag and foamy slag production.

2. Description of Background Art

Oxygen and carbon lances are known in the art of metal melting, refining and processing, particularly steel making, to be useful for the injection of carbon and oxygen for many steps in the process. In addition, auxiliary burners have been used to provide additional thermal energy and supersonic oxygen to these processes.

An electric arc furnace makes steel by first using an electric arc to melt one or more charges of scrap metal which is placed within the furnace. The scrap is charged by dumping it into the furnace through the roof from buckets which also could include charged carbon and slag forming materials. The arc melts the scrap into a molten pool of metal, an iron carbon melt, which accumulates at the bottom of the furnace. After a flat bath has been formed by melting of all the scrap introduced, the electric arc furnace enters a refining or decarburizing phase. In this phase, the metal continues to be heated by the arc until the slag forming materials combine with impurities in the melt and rise to the surface as slag. The charged carbon when the iron carbon melt reaches a boiling temperature combines with any oxygen present in the bath to form carbon monoxide bubbles which rise to the surface of the bath. Generally, at this time supersonic flows of oxygen are blown at the bath with from either lances or burners to produce a decarburization of the bath by the oxidation of the carbon contained in the bath. The carbon content of the bath is reduced to under 2% carbon where the iron carbon melt becomes steel and then further reduced until the grade of steel desired is produced, down to less than 0.2% for low carbon steels.

In higher power electric arc furnaces it is becoming a standard practice to use a long arc. When a long electric arc is struck, the radiative component of the arc above the bath can cause degradation to the furnace walls and the surrounding furnace equipment. The danger of this damage occurring is greatest after a significant portion of the scrap has been melted and the walls of the furnace are exposed to heat radiation from the arc and similarly thereafter during refining and flat bath conditions. Steelmakers have developed a foamy slag practice to protect the furnace components from the arc where the slag layer of impurities covering the iron carbon melt is foamed to increase its volume and rise above the arc. This foaming of the slag creates an insulative barrier between the arc and the furnace walls thereby protecting them from over heating. The overall process is also improved as the excess heat from the radiation of the arc is now used to heat the bath. Slag foaming practice differs for each EAF and operator preference. Slag foaming can begin as early as the first charge of scrap and can continue until the molten steel is tapped and the slag discarded.

The slag is conventionally foamed by bubbles of carbon monoxide caused from the oxidation of carbon with oxygen. To effectively foam slag these carbon monoxide bubbles should occur in the iron carbon melt, at the melt-slag interface or in the slag itself. If the slag has the right temperature, chemistry and viscosity, the carbon monoxide bubbles become entrained in the slag and cause its volume to increase rapidly to produce a lather or foam. Initially, the carbon which is charged with the scrap may form carbon monoxide bubbles by combining with oxygen which is in the bath or furnace during boiling or from additional oxygen blown into the bath with lances or burners. In addition, when the slag is hot, injected carbon particles either from lances or burners are used to form carbon monoxide bubbles by combining with FeO in the slag. The slag should be hot because the combination of carbon and FeO is an endothermic reaction which requires heat. Still further, oxygen may be present, either by injection from lances or burners or the furnace atmosphere, to oxidize carbon in the slag itself to carbon monoxide bubbles. In the latter case, the carbon in the slag may have been injected at the same time and from the same equipment as the carbon combining with the FeO to form carbon monoxide bubbles.

It is normal practice to inject the carbon and oxygen through burners or lances, or combinations thereof, at the same time, or nearly the same time, and directed to the same location, or nearly the same location. However, until the present invention, there have been some problems with directing the carbon and oxygen to the same, or nearly the same, location. The burners and lances previously used to provide this function were not very successful and efficient as they could be, because they direct the flows of carbon and oxygen in different directions.

Recently, there have been some attempts to combine oxygen and carbon injection lances with the oxy-fuel burner function. An important question for the integration of these functions into one apparatus has been whether to retain particulate injection capability or supersonic oxygen capability because both functions are the most advantageous if located along the central axis of the lance or burner.

Particulate injection is best done through a straight conduit which is located along the central axis of the apparatus used. A straight conduit is conventional because the particulates injected into a steel making furnace are highly abrasive and will wear out bends or other restrictions to their flow quickly. This is one of the reasons why particulates have not be injected through the same conduit as the one used for supersonic oxygen of a burner, the particulates would quickly wear out the converging restriction of the nozzle. A central conduit is preferred because it is highly disadvantageous to break the stream into more than one flow because one would like to concentrate particulates in a specific area. Also, the size of the particles and amount of particulates used for an injection is large in mass compared to other injected materials, such as gases, and a relatively large conduit is needed for reasonable flow rates.

Laval or supersonic nozzles are usually used in the production of high speed streams of oxidizing gas for injection into a steel making furnace. These supersonic gas flows are produced by the converging/diverging shape of the nozzle which at above a critical pressure causes the gas flow though the nozzle to become supersonic. Usually, an conduit is machined centrally in a lance or burner and then the passage is fitted with a converging/diverging section or nozzle. A large centrally located nozzle is desired because of the flow rates of supersonic oxygen desired.

It is also highly desirable to provide a subsonic flow of oxidizing gas for the burning of fuel, including regular fuel and carbon monoxide for post combustion, for the addition of auxiliary thermal energy, and the supersonic oxygen flow for providing oxygen in iron melt decarburization, assisting in foamy slag production or post combustion of carbon monoxide. A burner which provides subsonic and supersonic flows of oxygen through the same centrally located conduit is manufactured and commercially sold by Process Technology International, Inc. of Tucker, Georgia, the assignee of the present invention. The subsonic flow is produced by providing a pressure in the supply conduit lower than the critical pressure of the Laval nozzle being used in the conduit. When supersonic oxygen is needed, the pressure in the supply conduit is increased to above the critical pressure.

One attempt to combine the functions of carbon injection and supersonic oxygen in one apparatus is shown in U.S. Pat. No. 5,599,375. In FIGS. 3 and 5, a burner is described having carbon injection and supersonic oxygen. However, the carbon injection is not coaxial to the stream of oxidizing gas introduced through the burner and cannot be directed in sufficient quantities to be advantageous. Another attempt is shown in the same reference in FIG. 6 where a central carbon injection pipe is surrounded by a plurality of oxygen generating apertures which are described as Laval nozzles. This configuration is highly disadvantageous due to the small supersonic openings and dispersion of the supersonic oxygen due to flow turbulence of each small aperture interacting with that of the other apertures.

Therefore, there is a need for an apparatus which can direct a flow of particulate carbon and a flow of gaseous oxygen, preferably at a supersonic flow rate, in substantially the same direction and to the same location. There is also a need for a method whereby these flows can be introduced at the same time, or nearly the same time, such that an increased volume of carbon monoxide bubbles can be produced to foam slag in an electric arc furnace.

SUMMARY OF THE INVENTION

The invention provides an improved method and apparatus for metal melting, refining and processing, particularly steel making in an electric arc furnace.

In one embodiment of the method for a steel making process, auxiliary thermal energy is added to the process, particulates are introduced for the formation of slag, foamy slag or recarburization, and oxidizing gas is introduced for the decarburization of the melt, for the formation of foamy slag or for post combustion burning of carbon monoxide. Optionally, the oxidizing gas can be introduced as either a subsonic or supersonic flow.

According to the invention, one preferred embodiment of the apparatus comprises a burner or lance configuration which has a barrel shaped conduit for supplying a flow of particulates entrained in a carrier gas through its exit opening. Another barrel shaped conduit for oxidizing gas introduction is provided for producing a flow stream of oxidizing gas its exit opening. The exit openings of the particulate injection barrel and the oxidizing gas injection barrel are directed substantially in parallel to provide the flows to substantially the same location. More preferably, they are positioned side by side and are sized such that each diameter is approximately one half of the entrance diameter of the combustion chamber. According to another aspect of the invention, the oxygen injection barrel ends in an insert which contains a supersonic nozzle, preferably of the Laval type. The apparatus advantageously is capable of providing either subsonic or supersonic flows of oxidizing gas from the oxidizing gas conduit depending upon the oxidizing gas pressure.

The ends of the carbon injection conduit and the oxidizing gas injection conduit are mounted in a nozzle made of thermally conductive material, such as copper, to produce a nozzle assembly. The nozzle assembly has a conical surface which seats into a conical taper at the entrance end of a flame shaping chamber of a liquid cooled combustion chamber. The nozzle and the conduits disposed therein are thereby cooled by contact with the liquid cooled combustion chamber through the seat.

Another advantage of this arrangement is that the combustion chamber is shaped to provide a slight positive pressure for gases and/or particulates exiting the chamber. The positive pressure of the combustion chamber and the recessed position of the oxygen injection conduit and particulate injection conduit inside of the combustion chamber acts to prevent clogging and plugging when slag or steel splashing occurs in an electric arc furnace.

The burner includes a unique configuration which has a first barrel for providing finely pulverized particles entrained in a carrier gas and a second barrel for providing either supersonic or subsonic flows of an oxidizing gas. The exit ends of the first and second barrels are positioned side by side in a nozzle which inserts into the entrance of a flame shaping chamber of a fluid cooled combustion chamber. The nozzle also contains a plurality of fuel orifices for providing pressurized fuel to the combustion chamber and a plurality of secondary oxidizing gas orifices for providing a flow of an oxidizing gas around the periphery of the nozzle.

Because all of the flows of fuel, oxidizing gas and particulates pass through the flame shaping chamber, they are all substantially directed to the same location in the electric arc furnace. The directionality of the flows allows the burner to prepare a localized spot of the slag for foamy slag formation by initially heating the spot with thermal energy from the oxidation of the fuel by one or more of the oxidizing gases, from the oxidation of oxidizable components in the slag or the melt by the lancing of supersonic oxidizing gas, or from any combination of these. Once a localization in the slag is sufficiently prepared and heated, a flow of carbon is directed to the localized hot spot in the slag to reduce the FeO, and other oxides, in the slag to carbon monoxide and produce foamy slag. Optionally, the particulate carbon introduction can be accompanied by further oxidizing gas injection before, during or after the carbon injection.

Another advantage of an apparatus in this configuration is that it can be fixed in the furnace wall. Lances which have to be moved require relatively expensive lance manipulators and openings in the furnace through which they are positioned. If the opening is the slag door, the steel making process will be subject to the infiltration of ambient air through the slag door to produce another cold spot. The apparatus of the invention can be fixed in the furnace sidewall without air infiltration while providing a plurality of auxiliary functions highly desirable in steel making including melting and cutting scrap at cold spots, forming slag and foaming slag, decarburizing and recarburizing the melt, and post combustion of carbon monoxide.

These and other objects, aspects and features of the invention will be more clearly understood and better described when the following detailed description is read in conjunction with the attached drawings, wherein:

DETAILED DESCRIPTION OF A PREFERRED EMBODIMENT

Figure 1:
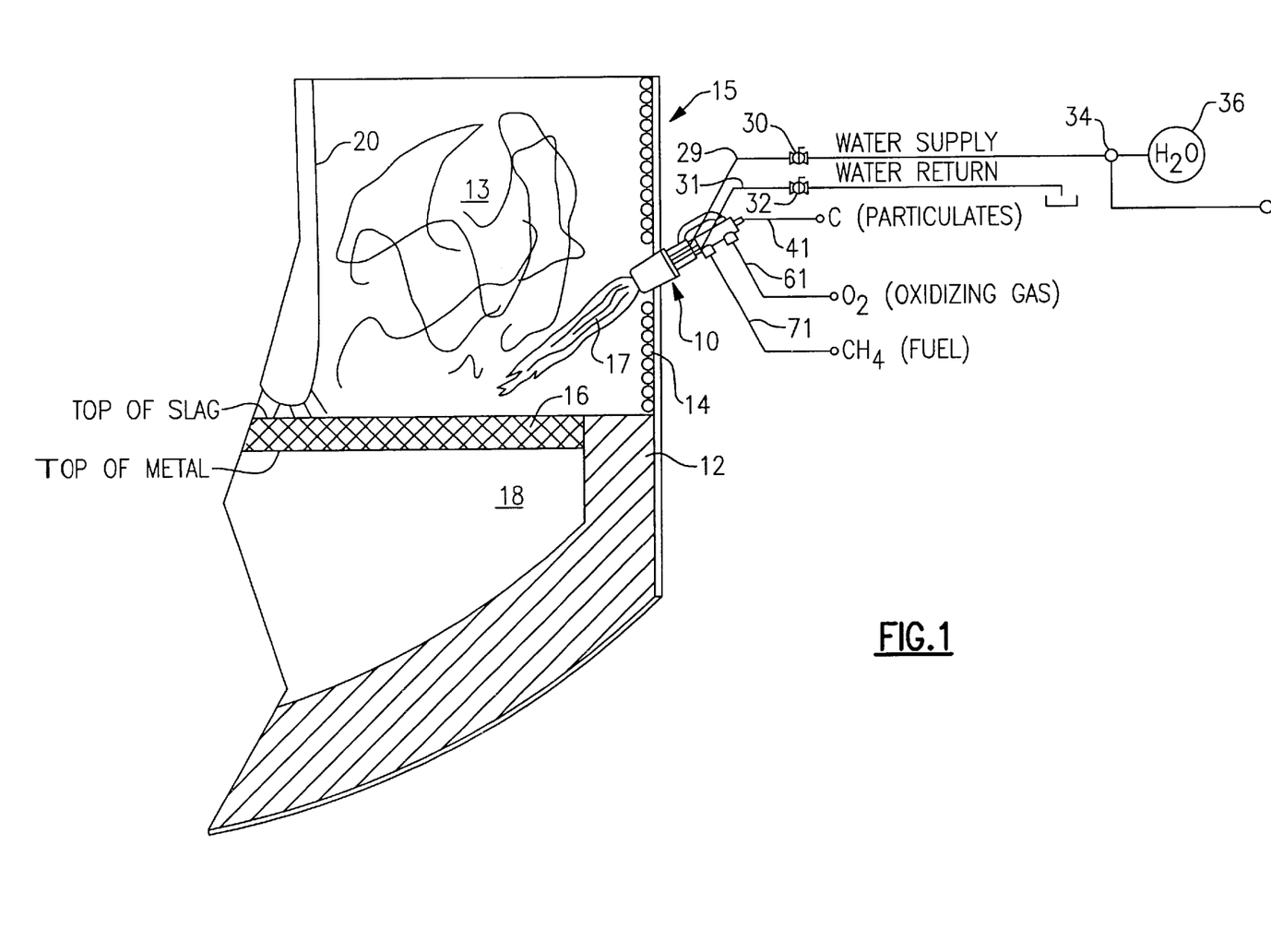
FIG. 1 is a schematic system diagram of the mounting of the improved burner in an electric arc furnace shown partially in cross-section.

A burner or apparatus 10 constructed in accordance with the invention is shown to advantage in FIG. 1. The burner 10 is adaptable to operate in several different modes to provide auxiliary heating, metal refining and other metallurgical processing capabilities in an electric arc furnace (EAF) 15, or other metal melting, refining and processing furnaces. The EAF 15 melts ferrous scrap 13, or other iron based materials, by means of an electric arc produced from one or more electrodes 20 to collect a molten metal melt 18 at its bottom. The melt 18 is generally covered with various amounts of slag 16 which is produced by chemical reactions between and the melt and slag forming materials added to the furnace before or during the melting process of the metal. Once the metal has been melted, the heat is generally refined or decarburized by oxygen lancing. This reduces the carbon content of the metal to the grade of steel desired. During refining and thereafter, the melt is typically heated by the electric arc above its melting temperature. This superheating allows the melt to boil and form further slag from impurities and increases the carbon oxidation with the lanced oxygen, The superheating is also used to allow the heat remain fluid while being transported in a ladle or other carrier to another process step.

The burner 10 is preferably mounted in the side wall 12 of the shell of the EAF 15 through an aperture in the fluid cooling coils 14 of the wall of the furnace 15. The burner 10 is fluid cooled and can withstand the high temperatures of the internal area of the furnace. This allows the burner 10 to be brought closer to the metal melt 18 and so that it can be more efficient in its operation. The burner 10 is slanted downward at an angle, preferably between 20–50 degrees, to direct a flame 17 of the burner 10 comprised of combustion products, and/or other injected materials, toward the metal melt 18 in the bottom of the furnace. In addition to its downward inclination, the burner 10 may also be directed from a radial position, preferably from 0–20 degrees tangentially.

Depending upon the configuration of the furnace, the burner 10 may be mounted anywhere on the sidewall and also may be mounted in the sump (not shown) of the furnace 15, if it is an eccentric bottom tapping furnace, or above or in its slag door (not shown). Additionally, the furnace may have more than one burner 10 mounted around its periphery, again depending upon its size, configuration and melting power. Generally, such burners are located at the cold spots in the furnace to assist with the melting of the scrap. These cold spots are different for DC (direct current) furnaces usually having one electrode and AC (alternating current) furnaces usually having three electrodes, and may be different even between these furnaces depending on size, manufacturer, and operating procedure of the furnace.

Figure 2:
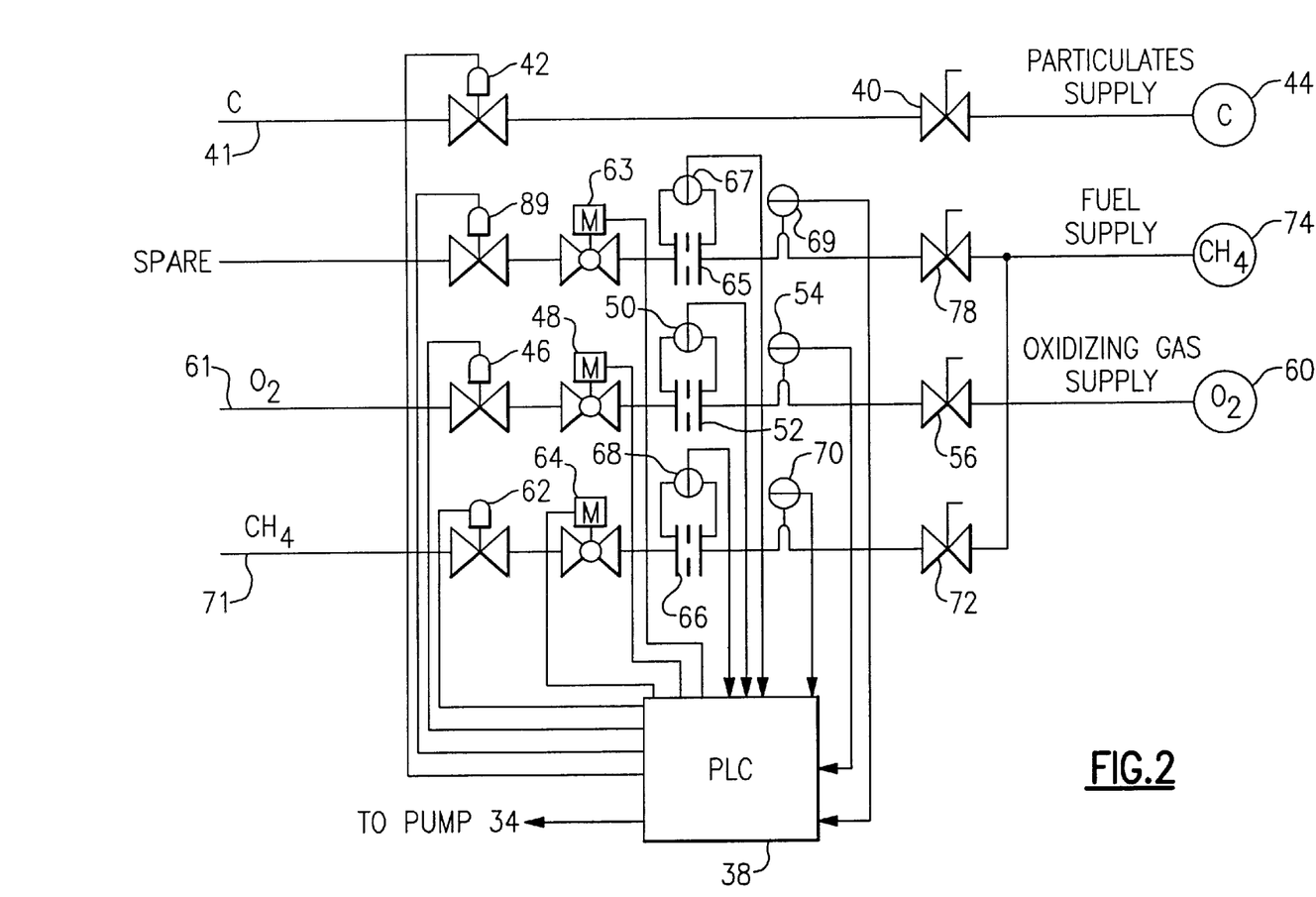
FIG. 2 is a schematic system diagram of the control system and utility provision for the burner illustrated in FIG. 1.

With reference now to FIGS. 1 and 2, the burner 10 is supplied with three utilities from an oxidizing gas supply 60, a fuel supply 74 and a particulate supply 44. Preferably, the oxidizing gas supply 60 provides commercially pure oxygen, but it could supply any of a combination of gases containing oxygen including air, a mixture of air and oxygen, or a mixture of oxygen and another gas, or gases. Preferably, the fuel supply 74 provides natural gas, but it could supply any of a combination of fuel fluids or gases including propane, fuel oil for atomization, or other types of combustible material. Preferably, the particulate supply 44 provides particulate carbon entrained in a carrier gas, but it could supply any of a combination of injectable materials including slag forming materials, alloying materials, metallurgical materials such as dolomite, iron carbide, etc. Each of the supplies 44, 60 and 74 is coupled to the burner through corresponding utility supply lines 41, 61 and 71 which have a number of controlled valves and sensing mechanisms with which to control the flow of the particular utility. For example, the oxygen supply line 61 from oxygen supply source 60 includes a solenoid shut off valve 46, a motorized proportional control valve 48, an orifice plate 52 and a manual shutoff valve 56. A differential pressure transmitter 50 is coupled across the orifice plate 52 to measures the pressure drop produced by the restriction and a pressure transmitter 54 is coupled to the supply line 61 to measure the absolute pressure in the line. Similarly, the natural gas supply line 71 includes a solenoid shut off valve 62, a motorized proportional control valve 64, an orifice plate 66 and a manual shutoff valve 72. A differential pressure transmitter 68 is coupled across the orifice plate 66 to measures the pressure drop produced by the restriction and a pressure transmitter 70 is coupled to the supply line 71 to measure the absolute pressure in the line. Additionally, the carbon supply line 41 includes an automatic control valve 42 and a manual shut off valve 40.

The operation, timing and control of the modes of the burner 10 are provided by a programmed logic controller (PLC) 38. The PLC 38 receives electrical inputs from the pressure transmitters 50, 52, 54, 70 representative of the measured pressures and determines the actual flow of the gases in the supply lines 61 and 71 from those parameters. The PLC 38 then provides electrical signals to the motorized control valves 48 and 64 to close or open them and provide regulation of the flow to a desired flow which has been programmed in the PLC for the different modes of operation. Standard closed loop control of the gas flows for the fuel and oxygen are maintained by the PLC 38 in this manner. For the control of the particulates or the carbon, the PLC 38 provides electrical signals to the control valve 42 to open or close. The flow rate of the carbon particles is provided by the pressurized particulate supply 44 and the supply line 41. Alternatively, the flow rate of the particulates can be controlled by the PLC 38 between a maximum flow and a minimum flow by varying the on and off times of the control valve 42 (duty cycle control).

The PLC 38 also provides electrical signals to each of the solenoid shut off valves 42, 46 and 62 so that the control may selectively turn on the supplies or shut them off under programmed control. Manual valves 40, 56, and 72 are provided to shut off the flow of utilities when the PLC 38 is not operating, such as when the burner is being removed for maintenance, and to turn them back on before start up. The PLC 38 further provides for the circulation of cooling fluid in the burner 10 by controlling the on/off timing of a water pump 34 connected to a water source 36 (see FIG. 1) which provides pressurized water to a water supply line 29. The water is circulated through the burner 10 to cool the combustion chamber and then returns back to a drain via a water return line 31.

Figure 3:
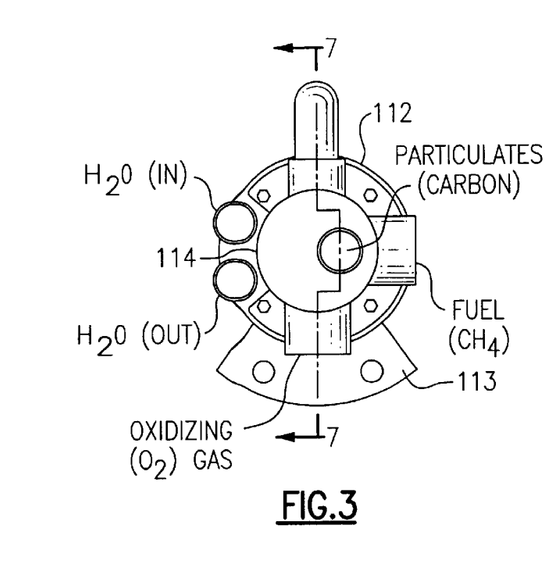
FIG. 3 is an end view of the burner illustrated in FIG. 1.
Figure 4:
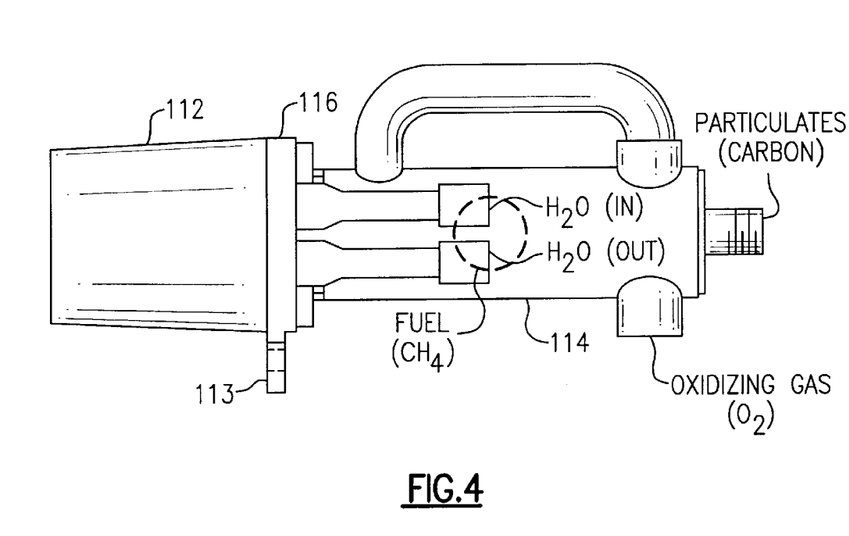
FIG. 4 is a side view of the burner illustrated in FIG. 1.

In FIGS. 3 and 4, the burner 10 with the capability of introducing combustion products, subsonic or supersonic oxidizing gas or particulate material into a metal melting, refining or processing furnace is shown to advantage. The injection or introduction of the utilities may be in any combination and at any time as programmed by the PLC control 38. The burner comprises a combustion chamber 112, preferably liquid cooled, for flame shaping and pre-combustion mixing of the fuel and a part of the oxidizing gas and a multiple conduit body portion 114 for bringing the injected materials into the combustion chamber through a nozzle. The combustion chamber includes a disk shaped mounting flange 116 with a mounting plate 113 which is easily bolted to a bracket to locate the burner relative to the furnace 15.

Figure 5:
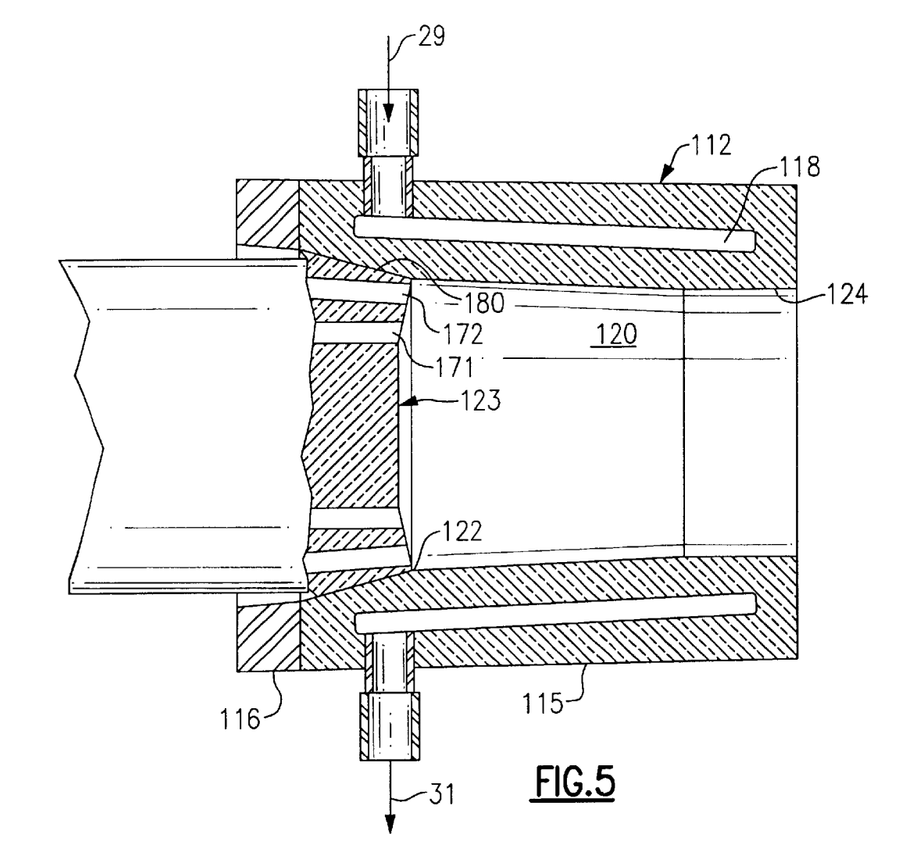
FIG. 5 is a partial cross-sectional view of the combustion chamber and nozzle assembly of the burner illustrated in FIGS. 3 and 4.
Figure 6:
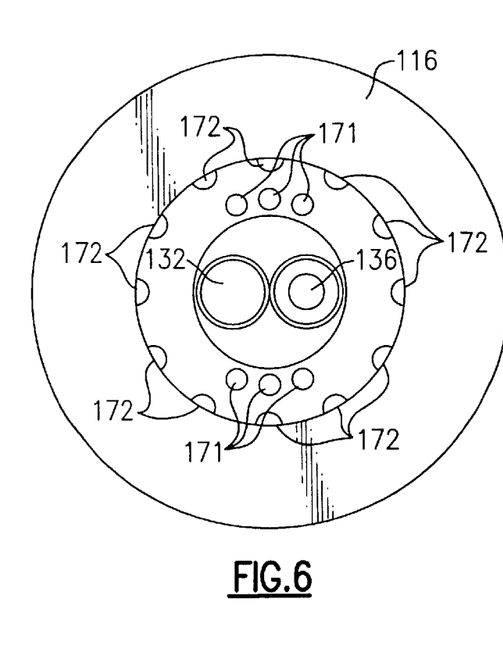
FIG. 6 is an front view of the burner illustrated in FIGS. 3 and 4.

In the illustrated implementation of FIGS. 5 and 6, the combustion chamber 112 is generally cylindrically shaped and includes a hollow combustion cone 115 welded to the mounting flange 116. The combustion cone 115 is preferably manufactured from a material with excellent thermal conductive properties, such as copper, and is provided with an annular cooling chamber or chambers 118 which circulates a cooling fluid, preferably water, to draw heat away from the inner surface of the combustion cone 1 15. The combustion cone 115 surrounds a tapered flame shaping chamber 120 which receives the injected utilities from the body portion 114 at its input end 122 through the nozzle 123 and discharges them through a discharge end 124 after shaping and mixing the pressurized flow of materials. The flame shaping chamber 120 is wider on its input end than 122 than at its discharge end 124 so that a positive pressure is maintained inside.

The nozzle 123 is generally shaped as a truncated conical section and connects various conduits to the flame shaping chamber 120. The nozzle 123 is formed to mate with an oppositely shaped conical section 180 machined in the entrance end 122 of the combustion cone 115. The nozzle 123 is manufactured of a material with excellent thermal conductive properties, preferably copper or the like, and is cooled by the contact conduction of thermal energy to the combustion cone 115. The nozzle 123 has a central countersink from its front face with a slight bevel so that the nozzle is easier to keep from being plugged. Around the periphery of the nozzle 123 are a plurality of secondary oxidizing gas orifices 172 which when the burner is assembled are in fluid communication with the third plenum 162 to provide a secondary flow of pressurized oxidizing gas.

Figure 7:
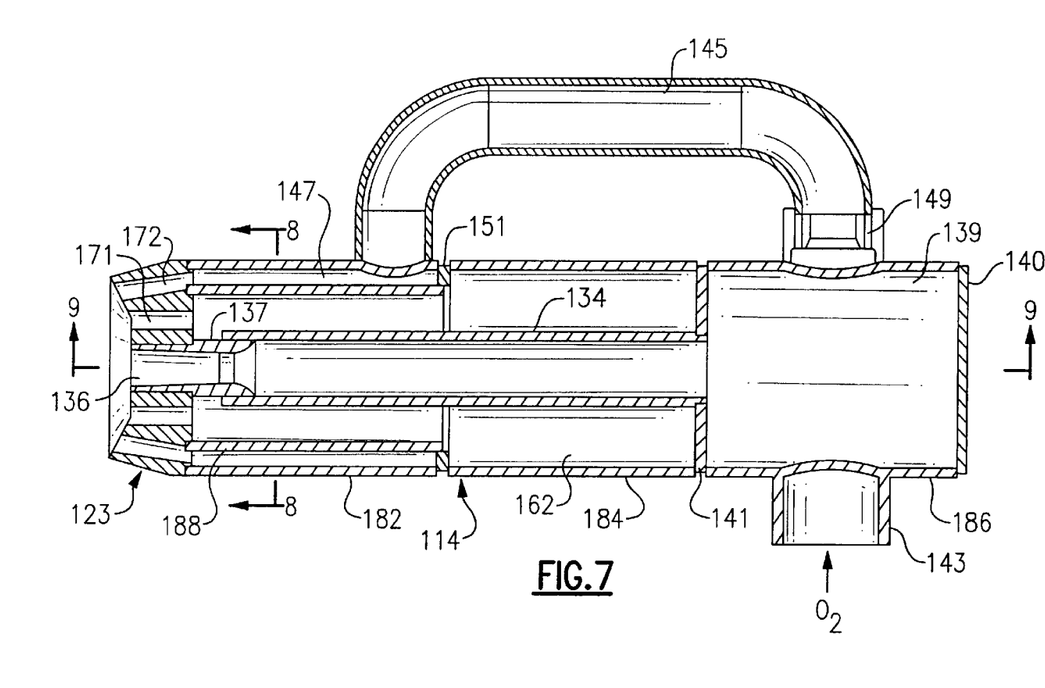
FIG. 7 is a cross-sectional side view of the body portion of the burner illustrated in FIG. 3 taken along section line A—A of that figure.
Figure 8:
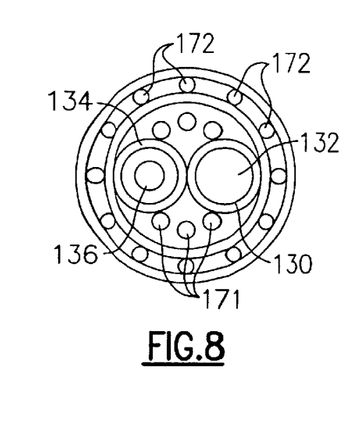
FIG. 8 is a cross-sectional end view of the body portion of the burner illustrated in FIG. 7 taken along section line B—B of that figure.

Preferably, as illustrated in FIGS. 6 and 8, the burner 10 comprises a nozzle 123 which when assembled includes the discharge exit of a first conduit means to supply a primary oxidizing gas, the discharge exit of a second conduit to supply pressurized particulate matter, a plurality of fuel orifices 170 to supply fluid fuel, and a plurality of gas orifices 172 to provide a secondary a pressurized oxidizing gas. As more detailed in FIGS. 7, 8 and 9, the body portion 114 of the burner 10 is implemented by a series of specialized flow conduits and plenums arranged to transport the pressurized flows of the materials to the nozzle 123 where they are introduced into the flame shaping chamber 120. The body portion 114 of the burner 10 comprises the nozzle 123 and three cylindrical sections 182, 184 and 186 concentrically aligned which are separated by a ring shaped spacer 151 and a baffle plate 141. The last section 186 is stopped with a baffle plate 140. Within the first section 182 is a fourth cylindrical section 188 fitting into a groove in the nozzle at one end and press fitting into the open center of the spacer 151. This arrangement defines three gas plenums for the burner 10 including a first oxygen plenum 139 formed by the inside surface of section 186 and the baffle plates 140, 141; a second oxygen plenum 147 formed between the inside surface of section 182 and outside surface of section 188 and stopped by spacer 151; and a fuel plenum 162 formed by the inside surfaces of sections 184, 188 and stopped by baffle plate 140.

Figure 9:
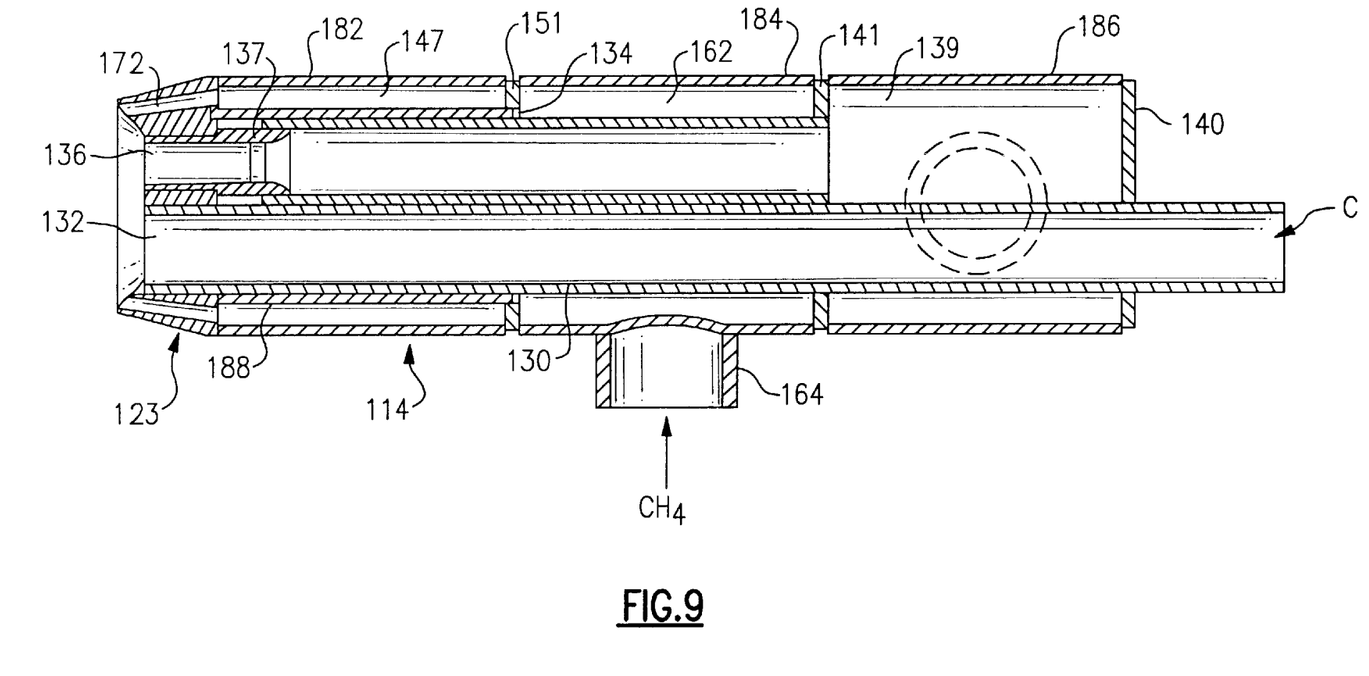
FIG. 9 is a cross-sectional side view of the body portion of the burner illustrated in FIG. 7 taken along section line C—C of that figure.

Preferably, a first tubular means 130, defining the first conduit 132, extends from the entrance end 122 of the combustion cone 115 to the particulate supply line 41. The first tubular means 130 is adapted to carry a particulate material entrained within a pressurized gas in the first conduit 132. Preferably, the particulate material is carbonaceous particles which can be injected into the furnace by their entrainment in a pressurized carrier gas. Arranged in a side by side manner with the first tubular means 130 is a second tubular means 134 and insert 137, defining the second conduit 136. The second tubular means 134 and insert 137 are adapted to carry a pressurized oxidizing gas, preferably oxygen, in the second conduit 136. The second tubular means 134 and insert 137 extend from the entry end 122 of the combustion cone 115 to the first oxidizing gas plenum 139. The oxidizing gas plenum 139 is connected to the oxidizing gas supply line 61 by means of a connector stub 143. On the opposite side of the first oxidizing gas plenum 139 from the connector stub 143, a bypass pipe 145 connects the first oxidizing gas plenum 139 to the second oxidizing gas plenum 147 through a normally open pressure actuated valve 149. The second oxidizing gas plenum 147 communicates with the plurality of secondary oxidizing gas orifices 172 in the nozzle 123.

The third fuel plenum 162 is adapted to carry a pressurized fuel, preferably natural gas. The third plenum 162 is in fluid communication with the fuel orifices 171 in nozzle 123. The fuel orifices 171 are directed generally in the same direction as the first conduit 132 and second conduit 136 and arranged in a semi-concentric ring above and semi-concentric ring below the exits of those conduits. The fuel orifices 171 in combination with the oxygen conduit 136 and the secondary oxygen orifices 172 support a staged combustion of the fuel.

Preferably, the particulates flow conduit 132 and the oxidizing gas flow conduit 136 are arranged in a side by side manner because they are designed to provide the largest flow rates for the burner 10 and this is an efficient configuration for that purpose. The cross-section of the input passage 122 for the combustion chamber 112 is substantially circular and the conduits 132, 136 have a similar cross section which when set side by side substantially fill the opening. In the illustrated implementation, the cross sectional diameters of conduits 132 and 136 are approximately equal and each is approximately one half of the diameter of the input passage 122. This allows the largest flow rate for both conduits without favoring one over the other. Similarly, if one conduit would need to be made larger than one half of the diameter of the input passage, the side by side arrangement would still allow the largest flow rate for the other conduit subject to that constraint. In that implementation, the sum of the diameters of the conduits 132, 136 would be approximately equal the diameter of the input passage.

The side by side arrangement also provides space segments in the input passage 122 where the fuel orifices 171 can be located, preferably in semiconcentric rings above and below the side by side conduits 132, 136. This arrangement provides a substantially symmetric flow of fuel to the combustion chamber 112. The fuel flow can be introduced alone or can be mixed with a flow of particulates from conduit 132, a flow of oxidizing gas from conduit 136, or both, as desired. The side by side arrangement is additionally effective with the introduction of a secondary flow of oxidizing gas from orifices 172, preferably arranged in a concentric ring about the periphery the input passage 122. This arrangement provides a substantially symmetric flow of secondary oxidizing gas to the combustion chamber 112. The secondary oxidizing gas flow can be introduced alone or can be mixed with a flow of particulates from conduit 132, a flow of oxidizing gas from conduit 136, a flow of fuel from orifices 171, or any combination thereof, as desired.

Independent of the advantages of symmetric multimaterial mixing and optimal flow rates for particulates and oxidizing gas, the side by side arrangement of the conduits 132 and 136 produce a flow trajectory for the materials carried which direct them to substantially the same place in the furnace 15. The flow direction of material for each conduit is along the central axis of the conduit into the flame shaping chamber 120. The axis of conduit 132 is preferably substantially parallel to the axis of conduit 136, each is contained in planes which are parallel. More preferably as illustrated in the figure, the axes are contained in the same plane in a side by side arrangement. The axes may be out of parallel slightly for adjustments to the flow directions, usually not more than 15 degrees.

While, in general, there are many modes of operation possible for the burner 10 illustrated in FIGS. 3–9, several preferred modes of operation will be described hereinafter. One mode of operation for burner 10 is a burner mode in which an oxidizing gas and fuel, preferably oxygen and natural gas, are supplied to the burner nozzle 123 at a specified oxidizing gas/fuel ratio. Normally, the oxidizing gas/fuel ratio will be stochiometric or slightly above stochiometric (oxidizing gas rich) to ensure that all the energy of the fuel is used efficiently to heat the scrap. In the burner mode, oxidizing gas is supplied through the second conduit 136 and the secondary oxidizing gas orifices 172 and fuel is supplied through the fuel orifices 171. The oxidizing gas is split between the second conduit 136 and the secondary orifices 172 by the bypass and the normally open valve 149 into substantially equal portions. This allows a staged combustion process where the first stage provided by the fuel and first oxidizing gas flow is fuel rich and produces a pyrolisis of the fuel. The initial stage of the combustion process is started in the combustion chamber and a shaped flame is discharged from the combustion chamber. The combustion process is completed outside of the combustion chamber by the remaining secondary oxidizing gas flow combining with the initial flame front to produce a highly luminous and generally bushy hot flame. This mode generally is used to provide additional thermal energy to the furnace in a rapid manner to assist the electric arc in the melting of the scrap inside of the furnace.

Additionally, in the burner mode, more or less thermal energy may be generated by the burner by increasing or decreasing overall fuel and gas flows with the control of the PLC 38. The burner illustrated has a significantly broad turn down ratio and such can be used to provide a low holding fire in the burner during times between scrap batches and at other idle times to prevent plugging by slag or steel splashes. A lower than maximum output can also be used during the initial phases of scrap melting when the scrap is still very close to the burner and maximum burner output could cause a flash back of the flame bouncing off the scrap and onto the burner and the furnace walls.

Another mode for the burner 10 is an oxygen lancing mode where supersonic oxygen is supplied to the furnace for melt refining, foamy slag production, or post combustion of carbon monoxide. In the supersonic lancing mode, the oxidizing gas pressure in plenum is increased by the control of the PLC 38 to where the flow through the first conduit and the supersonic nozzle accelerate the gas to above sonic velocities. The increased pressure in the plenum also closes the valve 149 to block the flow to the secondary oxidizing gas orifices. This supersonic flow of oxygen is used to lance the oxygen into the melt where it oxidizes constituents of the melt such as carbon, and other oxidizable materials. The oxidation of carbon in the melt assists in the melting process by producing heat and causes a lowering the carbon content of the melt. This mode of operation is normally used to assist in the refining process and can be continued until the carbon content reaches a desired level. The oxygen lancing also increases the slag temperature by the oxidation of Fe and other elements. This, in addition to other requirements, prepares the slag for foaming. Combined with injections of carbon at these spots after they are conditioned, this technique increases the volume of carbon monoxide bubbles to foam the slag.

Yet another mode is a particulate injection where the burner is used to supply particulate matter suspended in a carrier gas to the furnace for metallurgical purposes or to promote slag or foamy slag production. In this mode, particulate carbon can be injected to assist in the formation of foamy slag or to adjust the carbon content of the melt, for example, to recarburize the melt. Additionally, other particulates can be added to the electric arc furnace, such as slag preparation or slag producing agents.

The burner may also be used to assist in the post combustion of carbon monoxide to carbon dioxide. The oxidizing gas flow may be set by the PLC 38 controller 38 to provide an oxygen rich atmosphere in the furnace to post combust carbon monoxide from the process of refining, foamy slag formation or scrap melting. The oxygen rich atmosphere can be accomplished by a subsonic oxidizing gas flows from the second conduit and the secondary oxidizing gas orifices or from a supersonic oxidizing gas flow from the second conduit.

While the invention has been described in connection with a preferred embodiment, this specification is not intended to limit the scope of the invention to the particular forms set forth, but, on the contrary, it is intended to cover any such alternatives, modifications, and equivalents as may be included within the spirit and scope of the invention as defined by the appended claims.

What is claimed is:

1. A method of introducing particulates and/or an oxidizing gas into an electric arc furnace with a fluid cooled chamber having an input end and a discharge end, including the steps of:

introducing into the input end of the fluid cooled chamber a particulate flow along a first axis; and introducing into the input end of the fluid cooled chamber a primary oxidizing gas flow along a second axis, said first axis being substantially parallel to said second axis.

2. The method of introducing as set forth in claim 1 wherein:

said primary oxidizing gas flow is introduced at a supersonic velocity.

3. The method of introducing as set forth in claim 1 wherein:

said particulate flow is introduced as foamy slag forming materials entrained in a carrier gas.

4. The method of introducing as set forth in claim 3 wherein:

said particulate flow is introduced as carbon particles entrained in a carrier gas.

5. The method of introducing as set forth in claim 1 wherein:

said particulate flow is introduced as slag forming materials entrained in a carrier gas.

6. The method of introducing as set forth in claim 1 which further includes the steps of:

introducing into the input end of the fluid cooled chamber through a plurality of apertures surrounding said particulate flow and primary oxidizing gas flow, a fuel flow; and introducing into the input end of the fluid cooled chamber through a plurality of apertures surrounding said fuel flow, particulate flow and primary oxidizing gas flow, a secondary oxidizing gas flow.

* * * * *